JOHN V. BUTTERFIELD
HAROLD E. ROSENBERGER
INVENTORS

ATTORNEY

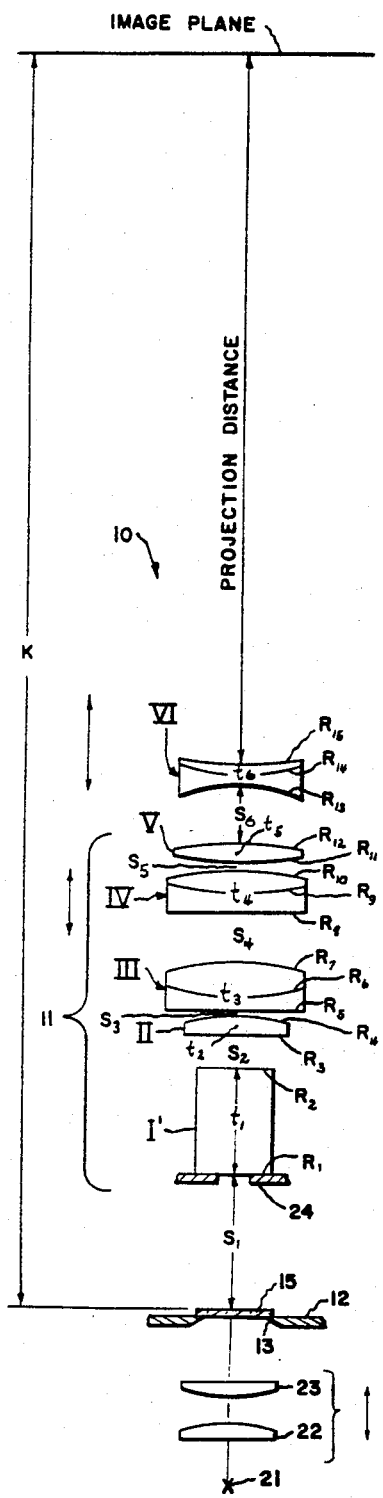
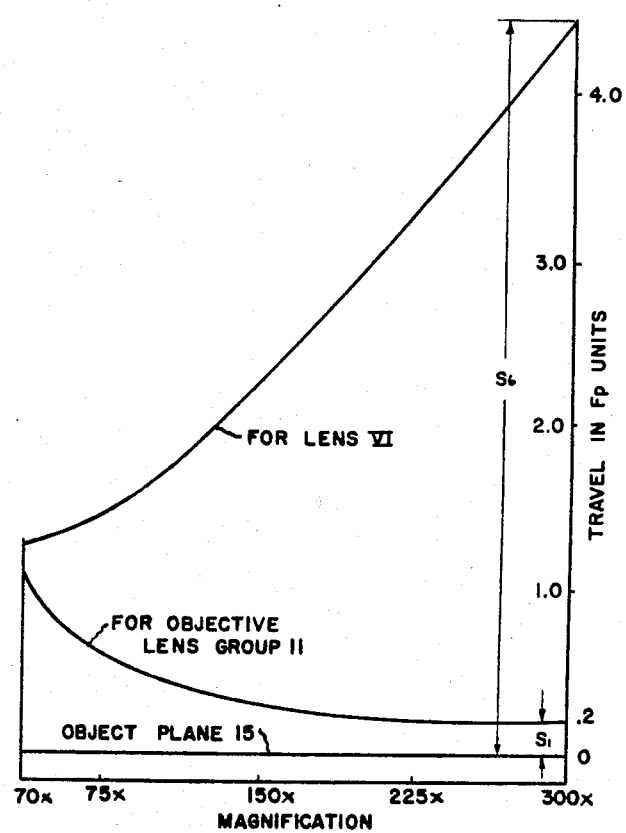
FIG. 3
FIG. 4
JOHN V. BUTTERFIELD
HAROLD E. ROSENBERGER
INVENTORS
BY Frank C. Parker
ATTORNEY

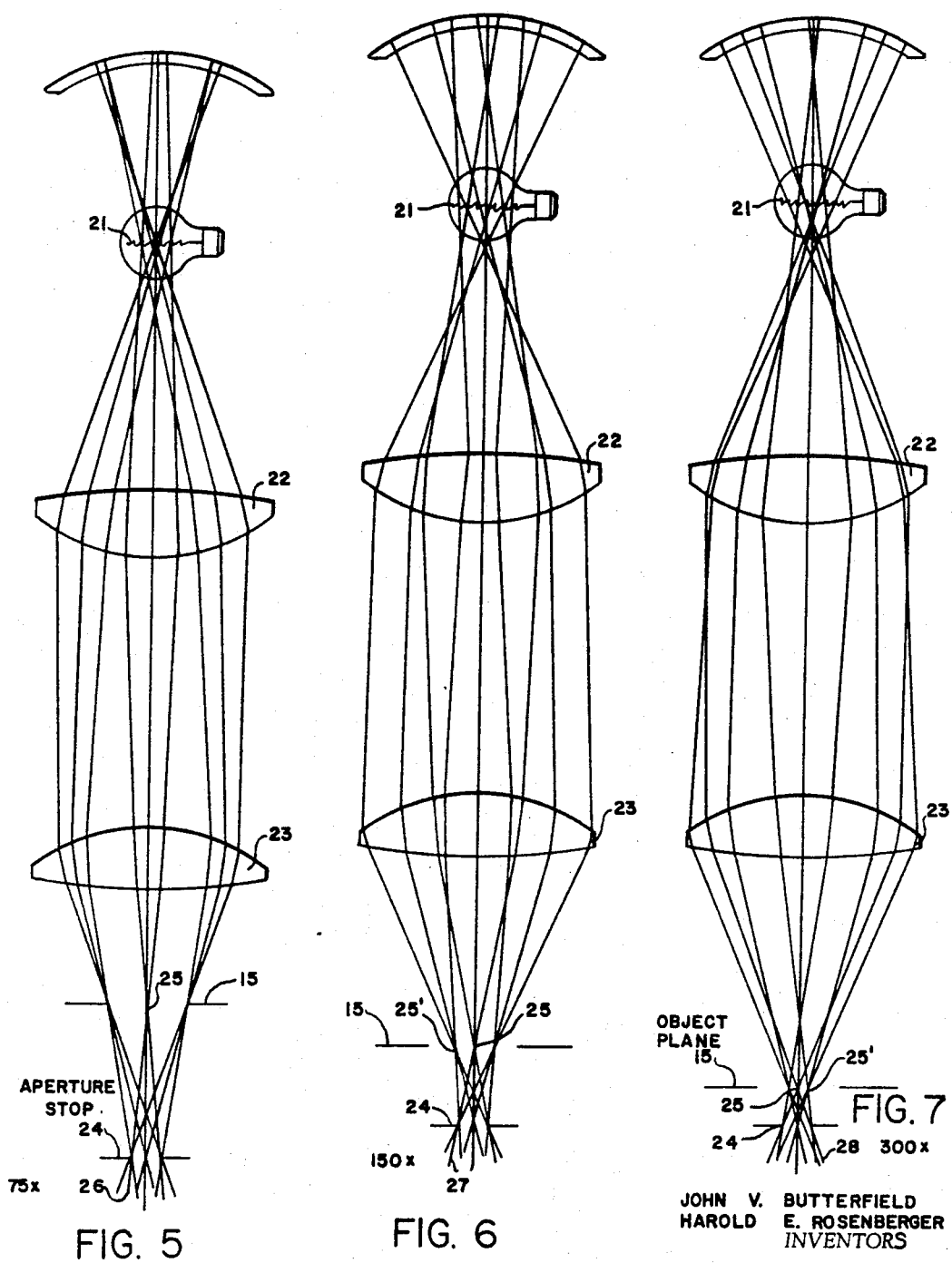

3,399,014
ZOOM TYPE LENS SYSTEM FOR MICROPROJECTORS HAVING CONSTANT BRIGHTNESS OF IMAGE
John V. Butterfield, Greece, and Harold E. Rosenberger, Brighton, N.Y., assignors to Bausch & Lomb Incorporated, Rochester, N.Y., a corporation of New York
Filed Mar. 22, 1965, Ser. No. 441,515
2 Claims. (Cl. 350—184)

ABSTRACT OF THE DISCLOSURE

A zoom type of lens system for a microprojector wherein the aperture stop of the system is located near the object on a glass body; said system consisting of a positive and a negative group, each of which is movable relative to each other and relative to an object surface to vary the magnification of the image formed by the system without changing its brightness.

---

The present invention relates to a zoom type of pancratic optical system for an optical projection device and more particularly relates to an improved optical system for a projection microscope.

The general form of optical system to which the present invention is related is exemplified by U.S. Patent No. 2,997,919, issued to W. G. Peck on Aug. 29, 1961, and the present invention provides important improvements over such optical systems, particularly with regard to increased numerical aperture and the maintenance of constant brightness of the image during changes of magnification.

To this end, it is an object of the present invention to provide a novel and improved zoom type of pancratic optical system for a projection microscope which has a magnification range of about 4, said system porviding an image of substantially constant brightness during changes of magnification within said range.

It is a further object to provide such a device wherein the image produced is well corrected for chromatic and monochromatic aberrations, and the associated field is relatively large and free from curvature throughout the entire zooming range.

Further objects and advantages are to be found in the form, arrangement and combination of parts of the invention by reference to the specification herebelow taken in connection with the drawings, wherein:

FIG. 3 is an optical diagram of a second form of this invention;

FIG. 4 is a chart of curves showing the motion of the optical members of the zoom lens system for the form illustrated in FIG. 3; and FIGS. 5, 6 and 7 are optical diagrams showing the critical parts of the illumination system in three operative positions for the form illustrated in FIG. 1.

In zoom types of pancratic optical systems, considerable difficulty is experienced in providing simultaneously such desirable optical conditions during all changes of magnification of the image as minimum axial shift of the image, constancy of correction for all axial and lateral aberrations, flatness of field, and constant brightness of the image.

Figure 1:
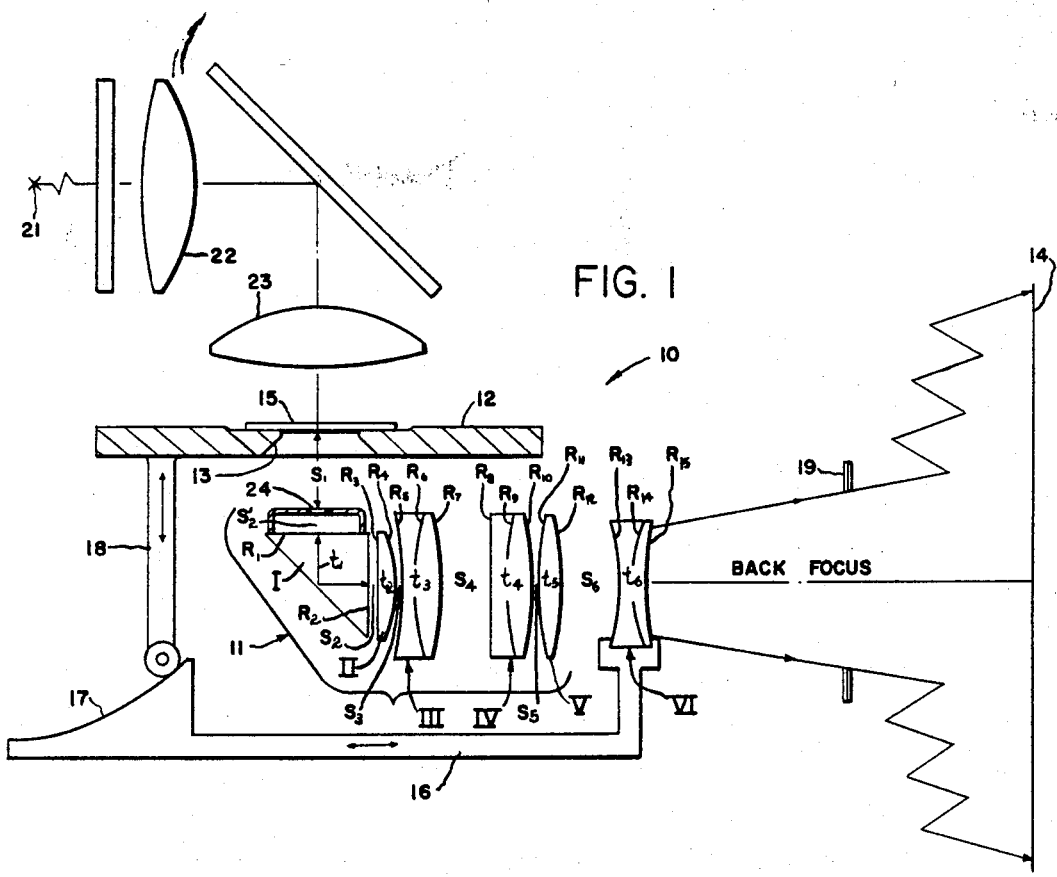
FIG. 1 is an optical diagram and partly schematic representation of one form of the present invention.

According to the present invention, the above-mentioned desirable characteristics are provided in a preferred form of optical system 10 as shown in FIG. 1, comprising the combination of an objective member 11, a compensating member VI and an apertured stage member 12 having an aperture 13 therein. The objective lens member 11 together with compensating lens member VI form an image of continuously varying magnification on a distant screen 14 of a specimen or object surface 15 which is held by or on the stage 12.

Two of said members as, for instance, the stage member 12, having the object surface 15 thereon, together with the compensating lens member VI are moved simultaneously in such a manner as to continuously vary the magnification of the aforesaid image through a range of magnification of substantially 4 with a minimum axial shift of said image. The mechanism by which this action is accomplished is shown schematically by the movable bar 16 to which lens VI is fixed at one end, the other end thereof having a curved cam surface 17 formed thereon in a suitable configuration to move a contacting arm 18 on the stage 12 up and down in a vertical direction such that when the stage is nearest optically to the objective lens member 11, the compensating lens member VI is farthest away therefrom. In the space between the compensating lens member VI and the screen 14 is preferably positioned a field restricted diaphragm 19.

One of the outstanding features and advantages of this form of the invention is the mechanism for varying the numerical aperture of the optical system in direct proportion to the change in magnification of the image with the resulting advantage that the brightness of the image formed on the screen 14 is substantially constant for all magnifications of the image. The means for accomplishing this result are provided by a light source 21 which in conjunction with a pair of condenser lenses 22, 23 evenly fill the aperture 24 and field with light at all magnifications.

The objective member 11 is, in this form of the invention, held stationary while the stage member 12 and compensating lens member VI are axially moved as aforesaid and the diaphragm 24 is deliberately chosen by position and diameter to be the aperture stop for the optical system. The zoom motion or position of the movable members is graphically represented for 75× magnification in FIGS. 1 and 5, for 150× magnification in FIG. 6, and for 300× magnification of the image in FIG. 7 which represents the total extent of the range of magnification in this embodiment of the invention.

With respect to the condenser lenses 22 and 23, the radii of the lens surfaces, the separation of the lenses, and the properties of the glass from which the lenses are made are all selected to yield the focal lengths which are required to provide the desired working distances between the aperture stop 24 and lens 23, and between the lens 22 and the light source 21. Additionally, said radii, lens spacing and glasses are selected to control image aberrations to such a degree that, considering the selected apertures, optimum illumination of the object plane 15 and zoom system aperture stop 24 are realized.

For maximum brightness and even distribution of light at the screen 14, the illuminating system must provide light pencils through any point in the object plane 15 which are equal in angular subtense, i.e., numerical aperture, to those pencils defined by the entrance pupil 24 (which is the aperture stop of the optical system 10), and the object point 25, and which are passed by the projection system 10. For all object points in the proximity of the axis of the condenser lens 23, pencils equal to the full angular aperture of the projection system 10 are passed and maximum brightness is realized at all image points corresponding to said pencils. The light pencils through extra-axial object points 25', however, become progressively diminished as the distance from the axis is increased, and this results in a progressive diminution or vignetting of illumination toward the edges of the projected image. This vignetted region of the image is masked out of the viewed image by a front diaphragm 19 located adjacent to the image side and rearwardly of the zoom lens VI whereby the amount of vignetting may be controlled.

During the zooming operation, the size of the real field in the object plane 15 varies in substantially inverse ratio to the change in magnification and it will accordingly be understood that the use of the diphragm 19 is an alternate to the use of an iris diaphragm at the object plane 15. In the position shown in FIG. 1, the diaphragm 19 serves to cut off the extreme oblique pencils of light leaving the lens VI.

An important contribution of the optical system 10 is the maintenance of a substantially constant size of the projected image throughout the zoom range of the system.

With reference to FIG. 5, the numerical aperture (N.A.) is defined as the sine of the angle which has its apex at point 25 in the object plane and has one side extending along ray 26 therefrom to the edge of the aperture stop 24. FIGS. 6 and 7 show how the numerical aperture is increased in direct proportion to increase in magnification, the edge ray in FIG. 6 being numbered 27, and the edge ray in FIG. 7 being numbered 28. Although the condenser lenses 22 and 23 and lamp 21 are stationary, light rays are projected at all angles required to illuminate the field covered by the lens system 10 at all operative positions thereof, and fill the numerical aperture of said lens system. In this way, the illumination characteristics of the condenser fulfill the changing requirements of the zoom optical system 10 so as to provide a constant brightness of the image for all magnifications of the image.

With regard to the optical construction of the projection zoom system 10, the optical member closest to the aperture diaphragm 24 is, in this form of the invention, a plano surfaced right-angled prism I which is equivalent to a plane parallel sided optical block as far as its optical effect is concerned. Spaced rearwardly from the prism I is a positive or collective lens designated II which constitutes the second optical part in the objective lens member 11. Spaced next rearwardly from lens II is a compound positive lens designated III which is axially spaced from a next rearwardly similar lens designated IV. In rearmost position in the objective lens member 11 is a collective lens V which is axially spaced rearwardly from lens IV.

Separated by a variable intervening space rearwardly of lens V is the aforesaid compensating lens member VI in the form of a compound lens structure. With reference to the optical axial spaces between said lenses, the front variable air space between the specimen surface 15 and aperture stop or diaphragm 24 is designated $S_1$, the fixed space between the prism I and lens II is designated $S_2$ and the fixed space rearwardly of lens II is designated $S_3$. $S_2 + S_2'$ in this form of the invention includes both of the air spaces adjacent to the entrance and exit faces of the prism I and lying between the aperture stop 24 and lens II. The axial space between the two compound lenses III and IV is designated $S_4$ while the space rearwardly of lens IV is designated $S_5$, both having a fixed value. The aforesaid variable space between the objective member 11 and the compensating lens member VI is designated $S_6$.

In order to achieve the objects of this invention the values for the focal lengths of the individual optical members I to VI, designated $F_I$–$F_{VI}$, as well as the intervening axial air spaces $S_1$–$S_6$ are given in the table of mathematical standards as ranges of values herebelow wherein $F_p$ designates the positive focal length of the objective lens member 11, $$F_I = \infty$$

$1.417F_p < F_{II} < 1.732F_p$
$10.228F_p < F_{III} < 12.50F_p$
$4.869F_p < F_{IV} < 5.952F_p$
$2.818F_p < F_V < 3.445F_p$
$1.376F_p < -F_{VI} < 1.681F_p$
$.7077F_p < S_1$ (low magnif.) $< .8649F_p$
$.1769F_p < S_1$ (high magnif.) $< .2162F_p$
$.1548F_p < S_2 + S_2' < .1892F_p$
$.02658F_p < S_3 < .03248F_p$
$.2366F_p < S_4 < .2891F_p$
$.002658F_p < S_5 < .003248F_p$
$.3076F_p < S_6$ (low magnif.) $< .3759F_p$
$3.976F_p < S_6$ (high magnif.) $< 4.860F_p$ It will be noted that the variable air spaces $S_1$ and $S_6$ are given for only the two ends of the range of movement of the movable members 11 and VI.

In this form of the invention as described numerically herebelow, it is found advantageous to maintain a diameter of the diaphragm 24 between $.1376F_p$ and $.1730F_p$ wherein the designation $F_p$ is the focal length of the objective member 11. This range of values for the diameter of the aperture stop results in a comparatively large numerical aperture at all magnifications throughout the zoom range. Furthermore, the relationship of the focal lengths of the objective member 11 to the compensating lens member VI is of considerable importance and may be numerically stated by the mathematical expression herebelow, $$1.376 < \frac{-F_p}{F_n} < 1.681$$

wherein $-F_n$ designates the negative focal length of the compensating lens member VI.

With respect to the compound lens III, the front lens element is of double concave form with the weakest curvature on the front side and it has a negative focal length with a value between $-1.735F_p$ and $-2.120F_p$. Further, with respect to the compound lens III the rear lens element is of double convex form and has a positive focal length having a value beteween $1.529F_p$ and $1.869F_p$. With respect to the compound lens IV, the front element is of plano-concave form and has a negative focal length with a value between $-2.164F_p$ and $-2.645F_p$ and further is composed of a double convex rear lens element having a positive focal length with a value between $$1.529F_p$$

and $1.869F_p$ and is substantially a duplicate of the corresponding element in lens III.

The double concave compound compensating lens member VI is composed of a front double concave lens element having a negative focal length with a value between $-.8369F_p$ and $-1.023F_p$ and is further composed of a rear meniscus lens element in contact with the front element and having a positive focal length with a value between $2.136F_p$ and $2.611F_p$. The axial thickness $t_1$–$t_6$ of the respective optical members I to VI are given as ranges of values in terms of $F_p$ in the table of mathematical expressions herebelow, $.5263F_p < t_1 < .6497F_p$
$.1010F_p < t_2 < .1234F_p$
$.2126F_p < t_3 < .2599F_p$
$.2126F_p < t_4 < .2599F_p$
$.07974F_p < t_5 < .09746F_p$
$.1329F_p < t_6 < .1624F_p$ The refractive index designated $n_D$ as well as the Abbe number designated $\nu$ is given in the table of numerical ranges herebelow, wherein the values are given for lens I, II, III (front), III (rear), IV (front), IV (rear), V, VI (front), and VI (rear), $1.493 < n_D < 1.503$ (I) —————— $64.0 < \nu < 70.0$
$1.512 < n_D < 1.522$ (II) —————— $62.0 < \nu < 67.0$
$1.715 < n_D < 1.725$ (III front) ———— $27.0 < \nu < 32.0$
$1.512 < n_D < 1.522$ (III rear) ————— $62.0 < \nu < 67.0$
$1.715 < n_D < 1.725$ (IV front) ———— $27.0 < \nu < 32.0$
$1.512 < n_D < 1.522$ (IV rear) ————— $62.0 < \nu < 67.0$ $1.557 < n_D < 1.567$ (V)     $49.0 < \nu < 53.0$
$1.512 < n_D < 1.522$ (VI front)     $62.0 < \nu < 67.0$
$1.715 < n_D < 1.725$ (VI rear)     $27.0 < \nu < 32.0$ More specific values for most of the above-named parameters are given in the table of values herebelow for one successful form of the present invention, wherein the designations have the same meaning as used in the description hereabove, $$F_{II} = 1.574 F_p$$
$$F_{III} = 11.36 F_p$$
$$F_{IV} = 5.411 F_p$$
$$F_V = 3.131 F_p$$
$$-F_n = -1.529 F_p$$
$$S_1 \text{ (at low power)} = .7863 F_p$$
$$S_1 \text{ (at median power)} = .3942 F_p$$
$$S_1 \text{ (at high power)} = .1966 F_p$$
$$S_2 = .03514 F_p$$
$$S_2 + S_2' = .1721 F_p$$
$$S_3 = .02953 F_p$$
$$S_4 = .2628 F_p$$
$$S_5 > .00150 F_p$$
$$S_6 \text{ (at low power)} = .3417 F_p$$
$$S_6 \text{ (at median power)} = 1.657 F_p$$
$$S_6 \text{ (at high power)} = 4.418 F_p$$
$$t_1 = .5263 F_p \text{ to } .6497 F_p$$
$$t_2 = .1122 F_p$$
$$t_3 = .2363 F_p$$
$$t_4 = .2363 F_p$$
$$t_5 = .08859 F_p$$
$$t_6 = .1477 F_p$$

A further specification of the optical parameters related to the table hereabove are given for the refractive index values $n_D$ and Abbe number $\nu$ in the chart herebelow,

| Lens Element | nD | $\nu$ |
| --- | --- | --- |
| I | 1.498 | 67.0 |
| II | 1.517 | 64.5 |
| III front | 1.720 | 29.3 |
| III rear | 1.517 | 64.5 |
| IV front | 1.720 | 29.3 |
| IV rear | 1.517 | 64.5 |
| V | 1.562 | 51.0 |
| VI front | 1.517 | 64.5 |
| VI rear | 1.720 | 29.3 |

The accompanying specification for the size of the diaphragm 24 is substantially $.1573 F_p$.

A still further specification for the optical parameters of the optical system 10 is given with respect to the radii of the lens refracting surfaces which are designated successively $R_1$–$R_{15}$ numbering from the aperture side of the optical system. The values for the respective refractive surfaces are given as ranges of values in terms of $F_p$ in the table herebelow, within the minus (—) sign refers to all lens surfaces which have their center of curvature located on the object or entrant side of the apex of the lens surface, $$R_1 = \text{Plano}$$
$$R_2 = \text{Plano}$$
$$R_3 > \pm 30.0 F_p$$
$$.7456 F_p < -R_4 < .9113 F_p$$
$$6.435 F_p < -R_5 < 7.865 F_p$$
$$1.558 F_p < R_6 < 1.904 F_p$$
$$1.558 F_p < -R_7 < 1.904 F_p$$
$$R_8 > \pm 10.0 F_p$$
$$1.558 F_p < R_9 < 1.904 F_p$$
$$1.558 F_p < -R_{10} < 1.904 F_p$$
$$2.609 F_p < R_{11} < 3.189 F_p$$
$$3.986 F_p < -R_{12} < 4.872 F_p$$
$$.8027 F_p < -R_{13} < .9811 F_p$$
$$.9650 F_p < R_{14} < 1.179 F_p$$
$$2.515 F_p < R_{15} < 3.074 F_p$$

As specified with regard to the aforesaid successful form of the invention, the values of $R_1$–$R_{15}$ may be stated as given in the table of values herebelow, $$R_1 = \text{Plano}$$
$$R_2 = \text{Plano}$$
$$R_3 = 44.29 F_p$$
$$-R_4 = .8285 F_p$$
$$-R_5 = 7.150 F_p$$
$$R_6 = 1.731 F_p$$
$$-R_7 = 1.731 F_p$$
$$R_8 = \text{Plano}$$
$$R_9 = 1.731 F_p$$
$$-R_{10} = 1.731 F_p$$
$$R_{11} = 2.899 F_p$$
$$-R_{12} = 4.429 F_p$$
$$-R_{13} = .8919 F_p$$
$$R_{14} = 1.072 F_p$$
$$R_{15} = 2.794 F_p$$

It will be noted in the above table of value that the radii $R_6$, $R_7$, $R_9$ and $R_{10}$ are all of the same value and it will be observed in the earlier tables that $t_3$ and $t_4$ are also the same whereby a cost reduction is effected in the manufacture of the optical parts.

By the use of the foregoing tables of values it will be found that the nominal axial over-all distances designated by the symbol K from the object plane 15 to the image on the screen 14 may be stated in the mathematical expression herebelow, wherein the range of values therefor are given, $$81.01 F_p < K < 99.01 F_p$$

One of the important and novel features of this invention is the plano optical member I which is constructed in the form of a prism having plano entrance and exit surfaces $R_1$ and $R_2$ which are at right angles to each other. As aforementioned, the surfaces $R_1$ and $R_2$ on the prism I are equal in optical effect to an optical block having plane parallel front and back surfaces for the entrance and exit of image rays. The thickness of the prism I along the optical axis and index of glass are advantageously chosen to contribute a variable correction for spherical aberration and this value should lie between $.5263 F_p$ and $.6432 F_p$. Said variable correction changes proportionately to changes in the numerical aperture during zooming motion as needed to compensate the aforesaid aberration which exists in the optical system. Furthermore, it is contemplated to form the prism I of an optical material having a well chosen Abbe number value between 64.0 and 70.0 whereby the chromatic aberrations of the optical system are improved independently of any other lens aberration. This combination of beneficial aberration corrections, it will be observed, are incorporated in a single optical member and in each aberration, the correction is variable and adjustable by itself to effect individually either the condition of spherical aberration or the chromatic aberration condition of the optical system.

Figure 2:
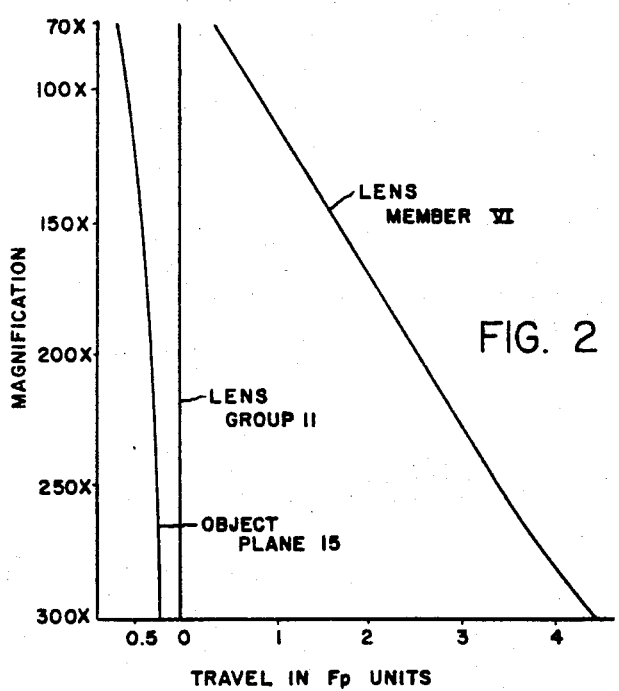
FIG. 2 is a chart of curves showing the motion of the optical members of the zoom lens system for the form illustrated in FIG. 1.

Another important feature of this invention is the fact that the stage 12 and compensating lens VI are moved axially in the optical system as mentioned heretofore with respect to the aperture stop 24 as shown in the motion chart FIG. 2 whereby the numerical aperture of the optical system varies substantially in value directly with the magnification of the image throughout the entire range of magnification. Because of this fact, the brightness of the image on the screen 14 always remains constant so that details of the specimen are projected with clarity at all magnifications of the image. In FIG. 1, mechanism is schematically shown for moving the stage 12 and compensating lens VI, said mechanism being shown in position of lowest magnification of the image which is converted to highest magnification by motion of the bar 16 toward the right.

A second form of the present invention is shown in FIG. 3 of the drawings wherein the objective member 11 and compensating lens member VI have exactly the same construction and are built with the same values of optical parameters as in the first form of the invention shown in FIG. 1. The principal difference between the first and the second forms of this invention relates to the manner in which the zoom operation of the lenses is accomplished, and the fact that the optical system is shown in vertical position rather than horizontal. The objective member 11 in the second form is movable axially in a predetermined manner with reference to motion of the compensating lens member VI, the motion of the respective movable parts and assemblies being shown substantially in the motion diagram in FIG. 4 of the drawings. In this form of the invention the stage member 12 is stationary and the variable air spaces $S_1$ and $S_6$ change because of the motion of objective member 11 and compensating member VI during the changes of magnification of the image.

The over-all dimension K will also be as stated hereabove.

A difference in the shape of the first optical part in the objective member 11 is to be noted since said part is a plane parallel glass block which is designated I' and has the same optical effect in the optical system 10 as the prism I as mentioned hereabove.

It will be perceived from the foregoing description that the present invention provides an improved zoom type of pancratic optical system which provides a substantially constant level of brightness of the image at all magnifications while maintaining good correction of the chromatic and monochromic image aberrations in conformity with the objects of this invention, and although only certain forms of this invention are herein shown and described, other forms are possible and changes may be made in the structural details of the parts within the ranges stated without departing from the spirit of the invention as defined in the claims here appended.

We claim:

1. A zoom type of variable magnification optical system for an optical projection device, said system being characterized by a front objective member and a rear compensating lens member, the local lengths of which are of opposite sign, and further characterized by a stage aperture member which holds a specimen at the object plane of said device in optical alignment with the other members, two of said members being moved coincidentally differentially with respect to a fixed point on the optical axis thereof in such a manner as to continuously vary the magnification of a stationary image formed thereby of said specimen through a magnification range of substantially 4, said system being corrected for chromatic and spherical aberrations, coma, astigmatism, distortion and field curvature throughout its range of operation, the objective member nearest to said specimen having a positive focal length designated $F_p$ and said compensating member having a negative focal length designated $-F_n$ and being numerically related to $F_p$ as given in the methematical expression herebelow, $$\left[1.376 < \frac{-F_n}{F_p} < 1.681\right]$$

$-F_n = 1.529F_p$ substantially, said objective member comprising a plane parallel foremost block designated I, a diaphram constituting the aperture stop of said system located at a variable axial distance $S_1$ from said specimen and at a distance $S_2'$ in front of said block, said diaphragm having a diameter value of $.1573F_p$ substantially, a collectively singlet lens II spaced rearwardly of said block at a constant axial air distance designated $S_2$ and having a focal length of $F_{II}$, a compound lens III spaced at a constant axial distance $S_3$ rearwardly of lens II, said lens having a positive focal length designated $F_{III}$ and being composed of a front double concave lens element in contact with a rear double convex lens element, another compound lens IV spaced a fixed axial distance $S_4$ rearwardly of lens III and having a positive focal length designated $F_{IV}$, said lens being composed of a front plano concave lens element in contact with a rearward double convex lens element, a singlet double convex lens V spaced a fixed axial distance $S_5$ rearwardly of lens IV and having a positive focal length designated $F_V$, said compensating lens member having a negative focal length $-F_n$ and being a compound lens VI located at a variable axial distance $S_6$ rearwardly of lens V, said member being composed of a front double concave lens element and a contiguous rear convex-concave lens element, the numerical values of said focal length $F_{II}$ to $-F_n$, said air spaces $S_1$ to $S_6$, and the axial thickness $t_1$ to $t_6$ of said successive block and lenses I to VI being specified substantially in the table of mathematical statements herebelow, $F_{II} = 1.574F_p$
$F_{III} = 11.36F_p$
$F_{IV} = 5.411F_p$
$F_V = 3.131F_p$
$[-F_n = 1.529F_p]$
$S_1$ (at low power) $= .7863F_p$
$S_1$ (at median power) $= .3942F_p$
$S_1$ (at high power) $= .1966F_p$
$S_2 = .03514F_p$
$S_2 + S_2' = .1721F_p$
$S_3 = .02953F_p$
$S_4 = .2628F_p$
$S_5 > .00150F_p$
$S_6$ (at low power) $= .3417F_p$
$S_6$ (at median power) $= 1.657F_p$
$S_6$ (at high power) $= 4.418F_p$
$t_1 = .5263F_p$ [to $.6497F_p$]
$t_2 = .1122F_p$
$t_3 = .2363F_p$
$t_4 = .2363F_p$
$t_5 = .08859F_p$
$t_6 = .1477F_p$ said optical system being further characterized by refractive index $n_D$ and Abbe number $\nu$ values for the block and the successive lens elements, starting with said block I, being as given substantially in the table of numeral values hereinbelow,

| Lens Element | $n_D$ | $\nu$ |
| --- | --- | --- |
| I | 1.498 | 67.0 |
| II | 1.517 | 64.5 |
| III | 1.720 | 29.3 |
| III rear | 1.517 | 64.5 |
| IV Front | 1.720 | 29.3 |
| IV Rear | 1.517 | 64.5 |
| V | 1.562 | 51.0 |
| VI Front | 1.517 | 64.5 |
| VI Rear | 1.720 | 29.3 |

2. A zoom type of variable magnification optical system for an optical projection device, said system being characterized by a front objective member and a rear compensating lens member, the focal lengths of which are of opposite sign, and further characterized by a stage aperture member which holds a specimen at the object plane of said device in optical alignment with the other members, two of said members being moved differentially with respect to a fixed point on the optical axis thereof in such a manner as to continuously vary the magnification of a stationary image formed thereby of said object plane through a magnification range of substantially 4, said system bring corrected for chromatic and spherical aberrations, coma, astigmatism, distortion and field curvature throughout its range of operation, the objective member nearest to said specimen having a positive focal length designated $F_p$ and said compensating member having a negative focal length designated $-F_n$ and being numerically related to $F_p$ as given in the mathematical expression herebelow, $$-F_n = 1.529 F_p$$

said objective member comprising a foremost plane-sided block designated I, an entrance diaphragm constituting the aperture stop of said system located at a variable axial distance $S_1$ from said specimen and at a distance $S_2'$ in front of said block, a collective singlet lens member II spaced rearwardly of said block at a fixed axial distance designated $S_2$, a compound lens designated III and spaced at a constant axial distance $S_3$ rearwardly of lens II and being composed of a front double concave lens element in contact with a rear double convex lens element, a second compound lens designated IV spaced a fixed axial distance $S_4$ rearwardly of lens III, said lens being composed of a front plano concave lens element in contact with a rearward double convex lens element, a sinlget double convex lens V spaced a fixed axial distance $S_5$ rearwardly of lens IV, said compensating lens member being a compound lens designated VI located at a variable axial distance $S_6$ rearwardly of lens V, said lens VI being composed of a front double concave lens element and a contiguous rear convex lens element, the constructional data for said optical system being given in the table herebelow wherein the successive refractive surfaces of the block and lenses I to VI are designated $R_1$ to $R_{15}$ numbering from the front of the system, the successive lens thicknesses of said block, lenses and elements being designated $t_1$ to $t_6$, the refractive index and Abbe number from which the lens parts are made being designated respectively $n_D$ and $\nu$, the minus (−) sign used with the R values being applied to any lens surface whose center of curvature is located on the object side of the vertex of the surface, $R_1$ = Plano
$R_2$ = Plano
$R_3$ = 44.29$F_p$
$-R_4$ = .8285$F_p$
$-R_5$ = 7.150$F_p$
$R_6$ = 1.731$F_p$
$-R_7$ = 1.731$F_p$
$R_8$ = Plano
$R_9$ = 1.731$F_p$
$-R_{10}$ = 1.731$F_p$
$R_{11}$ = 2.899$F_p$
$-R_{12}$ — 4.429$F_p$
$-R_{13}$ = .8919$F_p$
$R_{14}$ = 1.072$F_p$
$R_{15}$ = 2.794$F_p$
$S_1$ (at low power) = .7863$F_p$
$S_1$ (at median power) = .3942$F_p$
$S_1$ (at high power) = .1966$F_p$
$S_2$ = .03514$F_p$
$S_2 + S_2'$ = .1721$F_p$
$S_3$ = .02953$F_p$
$S_4$ = .2628$F_p$
$S_5$ > .00150$F_p$
$S_6$ (at low power) = .3417$F_p$
$S_6$ (at median power) = 1.657$F_p$
$S_6$ (at high power) = 4.418$F_p$
$t_1$ = .6497$F_p$
$t_2$ = .1122$F_p$
$t_3$ = .2363$F_p$
$t_4$ — .2363$F_p$
$t_5$ = .08859$F_p$
$t_6$ = .1477$F_p$

| Lens Element | $n_k$ | $\nu$ |
| --- | --- | --- |
| I | 1.498 | 67.0 |
| II | 1.517 | 64.5 |
| III front | 1.720 | 29.3 |
| III rear | 1.517 | 64.5 |
| IV front | 1.720 | 29.3 |
| IV rear | 1.517 | 64.5 |
| V | 1.562 | 51.0 |
| VI front | 1.517 | 64.5 |
| VI rear | 1.720 | 29.3 | the diameter of said diaphragm being substantially .1573$F_p$.

No references cited.

DAVID H. RUBIN, *Primary Examiner.*

R. J. STERN, *Assistant Examiner.*